(12) United States Patent
Desai et al.

(10) Patent No.: US 7,912,047 B2
(45) Date of Patent: Mar. 22, 2011

(54) METHOD AND PROGRAM FOR CLASSIFYING FRAGMENTED MESSAGES

(75) Inventors: Aditya Abhay Desai, Durham, NC (US); Charles Plilip Fricano, Raleigh, NC (US); Brian Keith Martin, Cary, NC (US); Gabriel Garcia Montero, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 11/615,345

(22) Filed: Dec. 22, 2006

(65) Prior Publication Data
US 2008/0151936 A1   Jun. 26, 2008

(51) Int. Cl.
*H04L 12/28* (2006.01)
(52) U.S. Cl. ............... 370/389; 370/395.42; 370/395.5; 370/546
(58) Field of Classification Search .......... 370/389, 370/395.42, 395.5, 546
See application file for complete search history.

(56) References Cited

U.S. PATENT DOCUMENTS

| | | | |
|---|---|---|---|
| 6,247,060 B1 | 6/2001 | Boucher et al. | |
| 6,278,838 B1 * | 8/2001 | Mendenhall et al. | 386/125 |
| 6,393,487 B2 | 5/2002 | Boucher et al. | |
| 7,519,598 B2 * | 4/2009 | Stewart et al. | 709/224 |
| 2005/0138638 A1 * | 6/2005 | Pilkington et al. | 719/316 |

FOREIGN PATENT DOCUMENTS
WO   2006/000566   1/2006

OTHER PUBLICATIONS

Jing, J. et al. "Client-Server Computing in Mobile Environments" ACM Digital Library, ACM Computing Surveys, vol. 31, No. 2, Jun. 1999 pp. 117-157.
Hussain, A. et al, "A Framework for Classifying Denial of Service Attacks", ACM Digital Library, USC/Information Sciences Institute pp. 99-110, Aug. 2003.
Spatscheck, O. et al, "Optimizing TCP Forwarder Performance" ACM Digital Library, IEEE/ACM Transactions on Networking, vol. 8, No. 2, Apr. 2000 , pp. 146-157.
Kirchhof, M. et al, "Component-Based Development of Web-Enabled eHome Services," L. Baresi et al. (Eds.) : UMICS 2004, LNCS 3272, pp. 181-196, 2004, Springer-Verlag Berlin Heidelberg.
Alpern, B et al, "PDS: A Virtual Execution Environment for Software Deployment," VEE 2005, Jun. 11-12, 2005, Chicago, Illinois, USA.
Marin, C et al, Sensor Bean : A Component Platform for Sensor-Based Services, MPAC '05, Nov. 28-Dec. 2, 2005, Grenoble, France.

* cited by examiner

*Primary Examiner* — Dang T Ton
*Assistant Examiner* — Robert M Morlan
(74) *Attorney, Agent, or Firm* — Carey Rodriguez Greenberg & Paul LLP; Jeanine S. Ray-Yarletts

(57) ABSTRACT

Prioritization of fragmented messages in an ORB is achieved by intercepting the flow of message data within the ORB, marking the current data stream location and issuing sufficient read commands to gather the message header and control area information. Then classification for priority can be performed using the data in the control area to classify the request. The classification information is stored for the message for later use by queuing and prioritization processes and the data stream marker is reset to the original location. When the queuing and prioritization processes are ready to dispatch the message, the message can be sent on to the higher levels of processing within the ORB where the higher levels of message processing code will process the message, totally unaware of the fact that the message has been classified and/or queued or prioritized prior to delivery to the higher level.

15 Claims, 4 Drawing Sheets

METHOD AND PROGRAM FOR CLASSIFYING FRAGMENTED MESSAGES

FIELD OF THE INVENTION

This invention relates generally to World Wide Web computer systems communicating over the Web using standard communications protocols and more particularly, it relates to classifying fragmented received messages according to their priority for message delivery or queuing for later forwarding. The specific communications protocols used are the well-known Common Object Request Broker Architecture (CORBA® Registered Mark of the Object Management Group) and the standard General Inter-Orb Protocol (GIOP) as transmitted over the network using the TCP/IP standard format and referred to as IIOP® (Registered Mark of the Object Management Group).

BACKGROUND OF THE INVENTION

Within the context of the CORBA standard, it often occurs that the messages become fragmented during transmission due to the Maximum Transmission Unit size that the communications network can tolerate, especially in the instance of large datagrams. Messages so fragmented are received at an ORB (Object Request Broker) where they are to be handled according to their priority for either immediate delivery to a client or for queuing for later delivery. It is common practice to exchange fragmented messages between ORBs operating in distributed environments such as the Web. However, fragmented messages greatly complicate the task of intercepting and classifying the requests contained in them for the usual purposes of message prioritization and queuing without significant modifications to the processing code in the ORB. Currently, in order to classify fragmented IIOP® messages, the lower levels of code in the ORB must be changed to deliver un-fragmented messages onward to the classification processing code in the higher levels and the code in such levels would need to be changed to handle un-fragmented messages.

As those familiar with the CORBA standard architecture for an ORB will readily appreciate, there are seven somewhat indistinctly-defined levels of processing within the standard architecture for an ORB. The present invention resolves the problem of prioritization and queuing of fragmented messages in an ORB by intercepting such messages between levels of processing in an ORB, marking the current data stream location where the interception occurs, issuing a message read command and then analyzing the message control areas, followed by resetting the data stream pointer to the original intercept location and then either queuing the message for later delivery or forwarding it for immediate processing by passing the message onward to the higher levels of code for such processing. This avoids the problem of having to provide extensive modifications to the existing code levels making up the CORBA standard ORB and has the added advantage of being transparent and unseen by the existing code levels as they remain unchanged. The invention adds a new, intermediate processing stage between lower levels and higher levels of code in the CORBA standard architecture model.

SUMMARY OF THE INVENTION

At a chosen classification interception point in the flow of message data within the ORB, new classification processing code marks the current datastream location and issues one or more message read commands to gather the message header and control area information. Once the message read functions are completed, the classification processing code classifies the request using the full message header and controls instead of just fragments thereof. Then the classification information is stored for the message for later use by queuing and prioritization processes, and the datastream marker is reset to the original location. When the queuing and prioritization processes are ready to dispatch the message, the message can be sent on to the higher levels of processing within the ORB where the higher levels of message processing code will process the message, totally unaware of the fact that the message has been classified and/or queued or prioritized prior to delivery to the higher level.

BRIEF DESCRIPTION OF THE DRAWINGS

The foregoing and other objects and advantages of the invention will be appreciated more fully from the following further description thereof with reference to the accompanying drawings, wherein.

DETAILED DESCRIPTION OF ILLUSTRATIVE EMBODIMENTS

Figure 1:
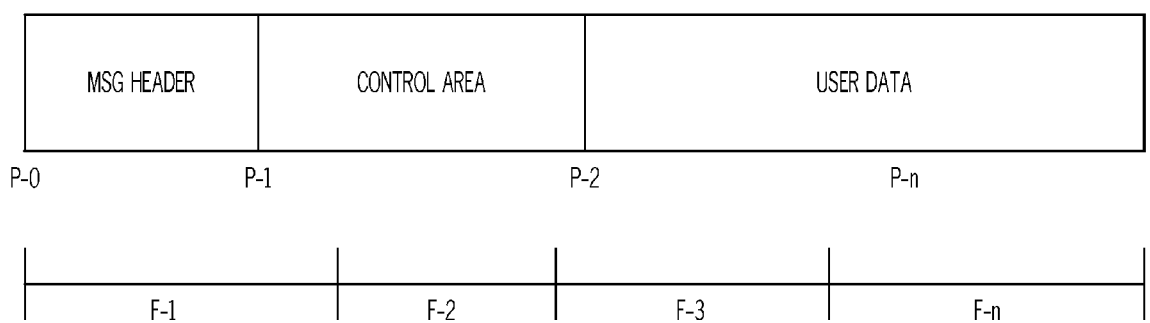
FIG. 1 illustrates schematically the general structure of an IIOP® message that has become fragmented during the transmission process over the network.

The invention will now be described in detail with reference to a preferred embodiment thereof as illustrated in the Drawings mentioned above.

Turning to FIG. 1, a schematic representation of the structure of an IIOP® message is shown. The message includes a message header portion that indicates that the message is, in fact, a GIOP message. It contains the GIOP version number identifier, a message type identifier, an identifier portion for indicating the size of the message, and, depending upon the version of GIOP being used, it contains the byte order or a bit flag field that includes the byte ordering as well as some reserved bit flags. GIOP version 1.0 requires a byte order identifier while GIOP version 1.1 adds support for message fragmentation and GIOP version 1.2 adds support for bidirectional communications. Versions 1.1 and 1.2 are backwards-compatible with earlier versions.

As shown in FIG. 1, the Message Header is followed by a Control Area. The Control Area contains one of seven different control type identifiers that indicate to a receiver that the message is a Request, a Reply, a Cancellation Request, a Locate Request, a Locate Reply, a Close Connection Request, a Message Error, or a Fragment identifier.

The Control Area is followed by the User Data or "message" area that contains the data specific to the particular type of message as defined in the Control area.

In binary format, the GIOP message structure is readily recognized by the fact that the Header contains four ASCII characters GIOP. These are followed by two bytes that define the first major and then minor version numbers. These are followed by a byte defining the message flags, the least significant bit of which identifies the byte ordering used as either 0 (big endian) or 1 (little endian). This, in turn is followed by one byte defining the message type (the Control area in FIG. 1) as being Reply, Request, Fragment, etc. This is then followed by a four byte word indicating the message size, not including the header portions.

The boundaries of the message header, the control area and the user data area in the message structure are indicated in FIG. 1 by the pointer identifiers P-0, P-1, P-2, etc. ending with P-n. Arbitrarily shown beneath the schematic message structure of FIG. 1 are some illustrative message fragments, F-1, F-2, F-3 etc. through F-n. It will be noticed that the boundaries of the message fragments may overlap or include less than the entire contents of the header portion, the control area portion and the user data portions of the example message structure in FIG. 1. This means that if the full message should contain classification data elements such as EJB Name (Enterprise Java® Beans), Method Name, Source/Target Host Name, Port Number, Application Name, Service Context content or more, that the classification information will not be immediately available from just one fragment of the message and would require the higher or lower levels of processing code in the ORB to be modified in order to properly extract and utilize the classification content.

In the preferred embodiment of the invention, this Classification information is stored for the target message for later use by queuing and prioritization processes that are added as intermediate processing steps between the levels of processing normally conducted in the ORB. This will be made clear and explained in greater detail below.

Figure 2:
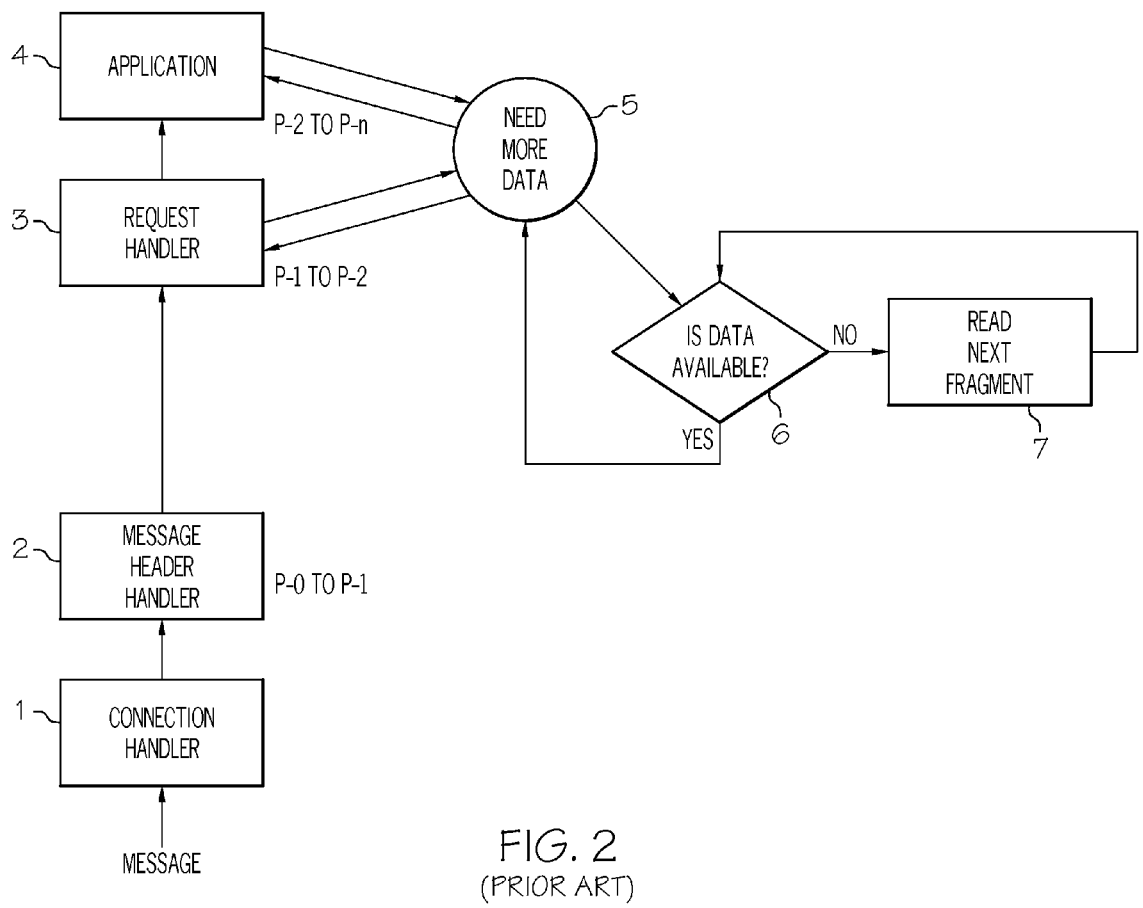
FIG. 2 is a programming flow diagram the existing ORB data flow for handling of fragmented messages, but which does not have the capability of providing prioritization and/or queuing of messages for delivery to the application or client.

Turning to FIG. 2, a schematic logic flow diagram of the existing processing portions within an ORB are illustrated. The Connection handler 1 receives the message data stream from other, lower levels of processing that interface the ORB to the physical network. The connection handler passes the received message data onwards to the Message Header handler, 2, which operates on the information illustratively indicated in FIG. 1 by the area of data between pointers P-0 and P-1. If a Request is identified by the Message Header handler 2, it passes the request to the Request Handler 3. The Request Handler 3 operates on the portion of the message between pointers P-1 and P-2, with reference to the illustration in FIG. 1. The Request Handler may need more data to complete its operations and this possibility is shown by the interchange it conducts with the Need More Data handler 5, which checks via box 6 to determine whether more needed data is available and, if not available, issues a Read next Fragment command in box 7 until the needed data is found in another fragment and is then returned to the Request handler via the path through the Need More Data handler 5. When the Request Handler 3 completes its functions, it passes the message onward to the Application or Client 4 for use there. The Application or Client may also require more data and it interfaces to the Need More Data handler 5 in similar fashion to that just explained for the Request Handler.

It will be noted from the description of FIG. 2 above that, should classification and/or prioritization functions be desired, there is no facility for accomplishing this in the existing ORB as illustrated in part in FIG. 2. This means that either something must be added to the Message Header Handler 2 or to the Request Handler 3, or both, if classification and prioritization processes are to be included. However, this would mean a major revision of the existing ORB code, a task not to be lightly undertaken, particularly so when the messages are fragmented.

The invention herein alleviates this requirement entirely by intercepting the message flow, somewhat arbitrarily, between the Message Header Handler 2 and the Request Handler 3 code levels in the ORB.

Figure 3:
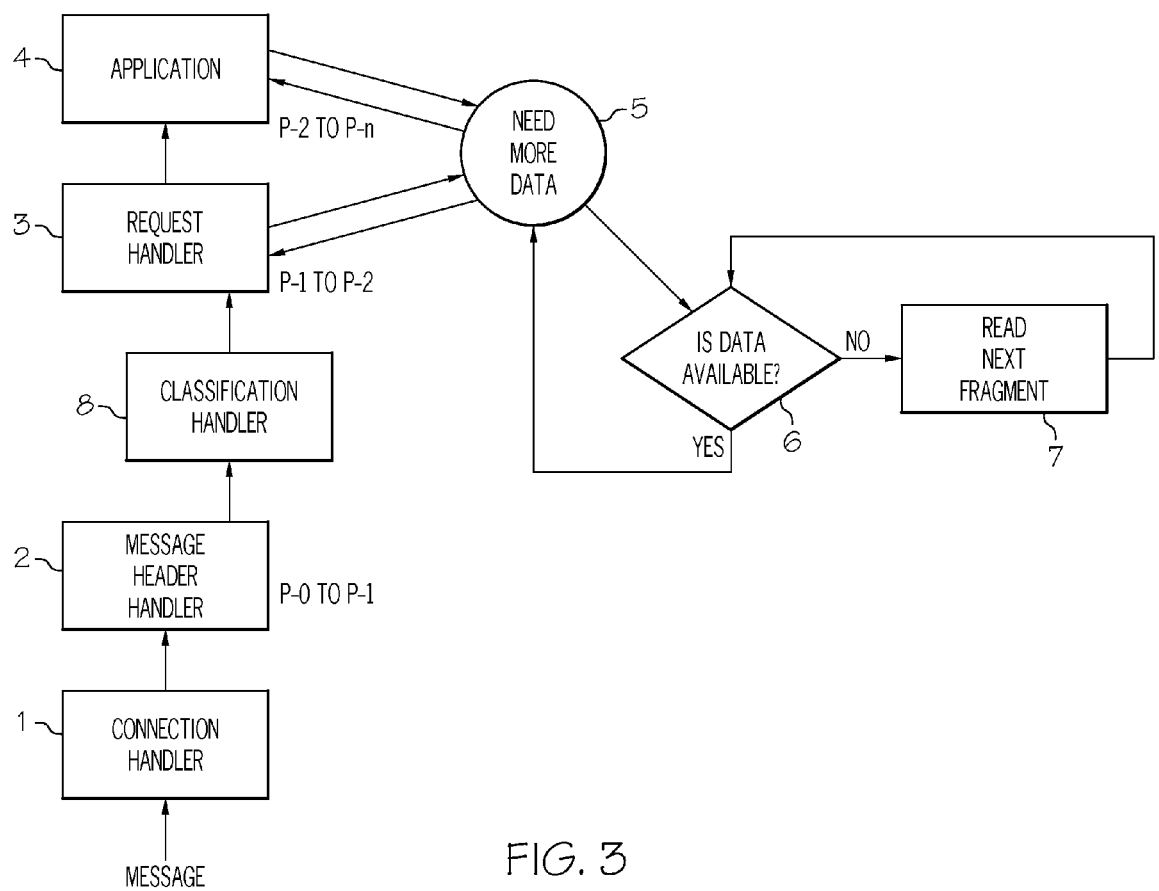
FIG. 3 illustrates schematically the general structure of an ORB data flow as modified in accordance with the invention to show the inclusion of a new, intermediate level of processing introduced between the existing message header handler level and the existing request handler level in an ORB. This new, intermediate level of processing performs the classification and prioritization and/or queuing of requests or messages.

In FIG. 3, the Classification Handler 8 of the invention intercepts the data flow between the Message Header Handler 2 and the Request Handler 3. While this may introduce a brief hiatus of smooth data from between the two levels indicated in the ORB, it is unseen by either the Message Header Handler 2 or the Request Handler 3.

Figure 4:
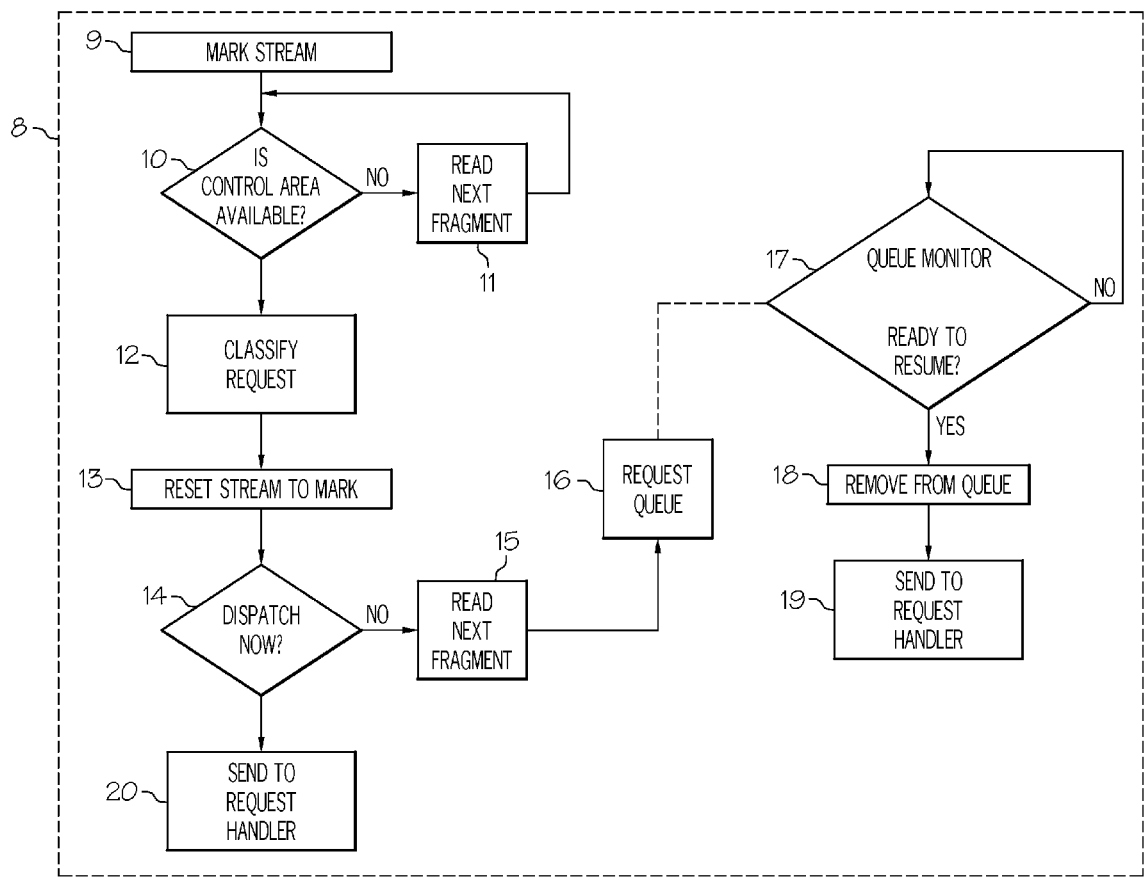
FIG. 4 illustrates in detail the schematic logic and flow of the intermediate level of code in a preferred embodiment of the invention.

The details of the embodiment of Classification Handler 8 of the invention are shown in FIG. 4. Turning to FIG. 4, box 9 of the Classification Handler 8 receives the data stream from the Header Handler 2 of FIG. 3 and proceeds to mark the stream location at which the intercepted data begins. Next, the Classification Handler 8 analyzes the message fragment received following the mark to determine whether the Control Area of the message as shown in FIG. 1 has been found. This is done in box 10 and, as indicated therein, if the Control area has not yet been found, it causes the issuance of a Read next Fragment command in box 11 and awaits receipt of that fragment from the Header Handler 2. When sufficient data has been received to contain the Control area of the message, the message may be classified as to Request type as shown in box 12 and then the data stream pointer or mark is reset to deliver the datastream from the original interception point onwards for further processing as shown in box 13.

Depending upon the classification information found in box 12, prioritization of the message for immediate or for later delivery to the Client or Application may be determined as shown in box 14. If the prioritization information discovered from the analysis in the request classification step of box 12 indicates that immediate delivery to the Application or Client is called for, the data stream is forwarded to the Request Handler 3 as shown by box 20. However, if classification indicated a deferred delivery due to lower priority, etc., the intercepted data stream is suspended and queued in box 15 which adds it to a Request Queue in box 16 which is monitored by a Queue Monitor in box 17 until the priority of the Request matches that next to be delivered to the Application or Client, whereupon the queued Request is removed from the queue in box 18 and delivered to the Request Handler 3 as shown in box 19.

Returning to the explanation of the preferred embodiment for box 9, the function of marking the datastream where the data is intercepted is actually done by saving in memory the current read location pointer. Normally, as data bytes are received by a receive processing thread, there is a receive pointer associated with a data buffer into which the received bytes are loaded. The pointer tells the receive processing thread where to insert the next sequentially received byte of data in the buffer. The receive thread only function is to load the received bytes into the receive buffer. However, a second thread, the working thread, uses a read pointer to tell the working thread the next location from the buffer that it is to read from to get the next byte of data. This read pointer value is what is saved when the preferred embodiment of the invention intercepts the data stream for classification and prioritization processing. The processes in FIG. 4 continue to read from the receive buffer until enough of the message has been read to enable the classification and prioritization to occur, and based on that analysis, the message is either dispatched onward to the Request Handler 3 or is queued for later dispatch as already detailed above. The read pointer is restored to its original "interception" value when the message is to be dispatched by giving the read pointer value to the Request Handler to proceed with its operations. The Request Handler is unaware that the message may have been intercepted, possibly queued and held for a time, and then delivered to it and no modifications of either the Header Handler level 2 or the Request Handler level 3 are necessary. While this description has been given for the handling of fragmented messages, it is equally applicable to un-fragmented messages and provides a convenient way of adding prioritization and or queuing of messages in an ORB without the necessity of modifying any of the existing ORB programming.

As will be apparent to those of skill in the art, the technique of this invention enables classification and prioritization of fragmented or un-fragmented messages in an ORB without having to modify any of the levels of existing ORB code and performs its function transparently so that the receiving higher levels of ORB code are unaware that classification or prioritization has already occurred when the message is received at such levels. There are other variations or functions that could be performed in this same way, so what is described and set forth in the Claims which follow is intended to be by way of description and not of limitation.

What is claimed:

1. A method of classifying messages in an object request broker (ORB) comprising steps of:
   intercepting a message data stream of a message between processing levels in an ORB,
   marking a location of the message data stream with a data stream marker at which interception of said message has occurred,
   analyzing the message data stream to determine whether a message header control area of the message data stream has been acquired and, if said message header control area has not yet been acquired, repeatedly issuing data read commands on said message data stream until said message header control area has been acquired,
   classifying said message using data in said message header control area, and
   resetting the data stream marker to the location.

2. A method as described in claim 1, further comprising steps of:
   dispatching said message to a next level of code in said ORB for processing or queuing said message for later dispatch according to a classification of said message.

3. A method as described in claim 1, further comprising steps responsive to said classifying step of suspending said message in a queue for later dispatch according to a priority of said message.

4. A method as described in claim 2, further comprising steps responsive to said classifying step of suspending said message in a queue for later dispatch according to a priority of said message.

5. A method as described in claim 4, further comprising steps of:
   monitoring a flow of subsequent messages in said ORB and removing said suspended and queued message from said queue and dispatching said removed message to a next level of code in said ORB whenever a priority of said removed message exceeds a priority of said monitored subsequent messages flowing in said ORB.

6. A method as described in claim 1, wherein:
   said intercepting of said message data stream is performed between a message header handler level and a request handler levels of code in said ORB.

7. A system in an object request broker (ORB) for classifying messages comprising:
   a data intercepting mechanism for intercepting a message data stream flowing in an ORB between processing levels in an ORB,
   a marking mechanism for marking a location of the message data stream at which said data intercepting mechanism intercepts said message data stream,
   an analyzing mechanism for examining the said intercepted message data stream to determine whether a message header control area of the message data stream has been acquired and,
   if said message header control area has not yet been acquired, repeatedly issuing data read commands on the message data stream until said message header control area has been acquired, and,
   a classifying mechanism for classifying said intercepted message data stream using data in said message header control area, and for resetting the data stream marker to the location.

8. The mechanism of claim 7, further comprising:
   a mechanism for dispatching said message to a next level of code in said ORB for processing or queuing said message for later dispatch according to a classification of said message.

9. The mechanism of claim 7, further comprising:
   a mechanism responsive to said classifying mechanism for suspending said message in a queue for later dispatch according to a priority of the message.

10. The mechanism of claim 9, further comprising:
    a monitoring mechanism for monitoring a flow of subsequent messages in said ORB and for removing said suspended and queued message from said queue and dispatching said removed message to a next level of code in said ORB whenever a priority of said message exceeds that of said monitored subsequent messages flowing in said ORB.

11. A program product stored on a non-transitory recordable medium for classifying messages in an object request broker (ORB) which, when executed, comprises:
    program code for intercepting a message data stream of a message between processing levels in an ORB,
    program code for marking a location of the message data stream with a data stream marker at which interception of said message has occurred,
    program code for analyzing the message data stream to determine whether a message header control area of the message data stream has been acquired and, if said message header control area has not yet been acquired, repeatedly issuing data read commands on said message data stream until said message header control area has been acquired,
    program code for classifying said message using data in said message header control area, and
    program code for resetting the data stream marker to the location.

12. A program product as described in claim 11, further comprising:
    program code for dispatching said message to a next level of code in said ORB for processing or queuing said message for later dispatch according to a classification of said message.

13. A program product as described in claim 11, further comprising:
    program code responsive to said classifying step of suspending said message in a queue for later dispatch according to a priority of said message.

14. A program product as described in claim 12, further comprising:
 program code responsive to said classifying step of suspending said message in a queue for later dispatch according to a priority of said message.
15. A program product as described in claim 14, further comprising:
 program code for monitoring a flow of subsequent messages in said ORB and removing said suspended and queued message from said queue and dispatching said removed message to a next level of code in said ORB whenever a priority of said removed message exceeds a priority of said monitored subsequent messages flowing in said ORB.

\* \* \* \* \*